Jan. 13, 1942.   A. NOVICK   2,269,954
ENVELOPE MACHINE
Filed March 23, 1939   10 Sheets-Sheet 5
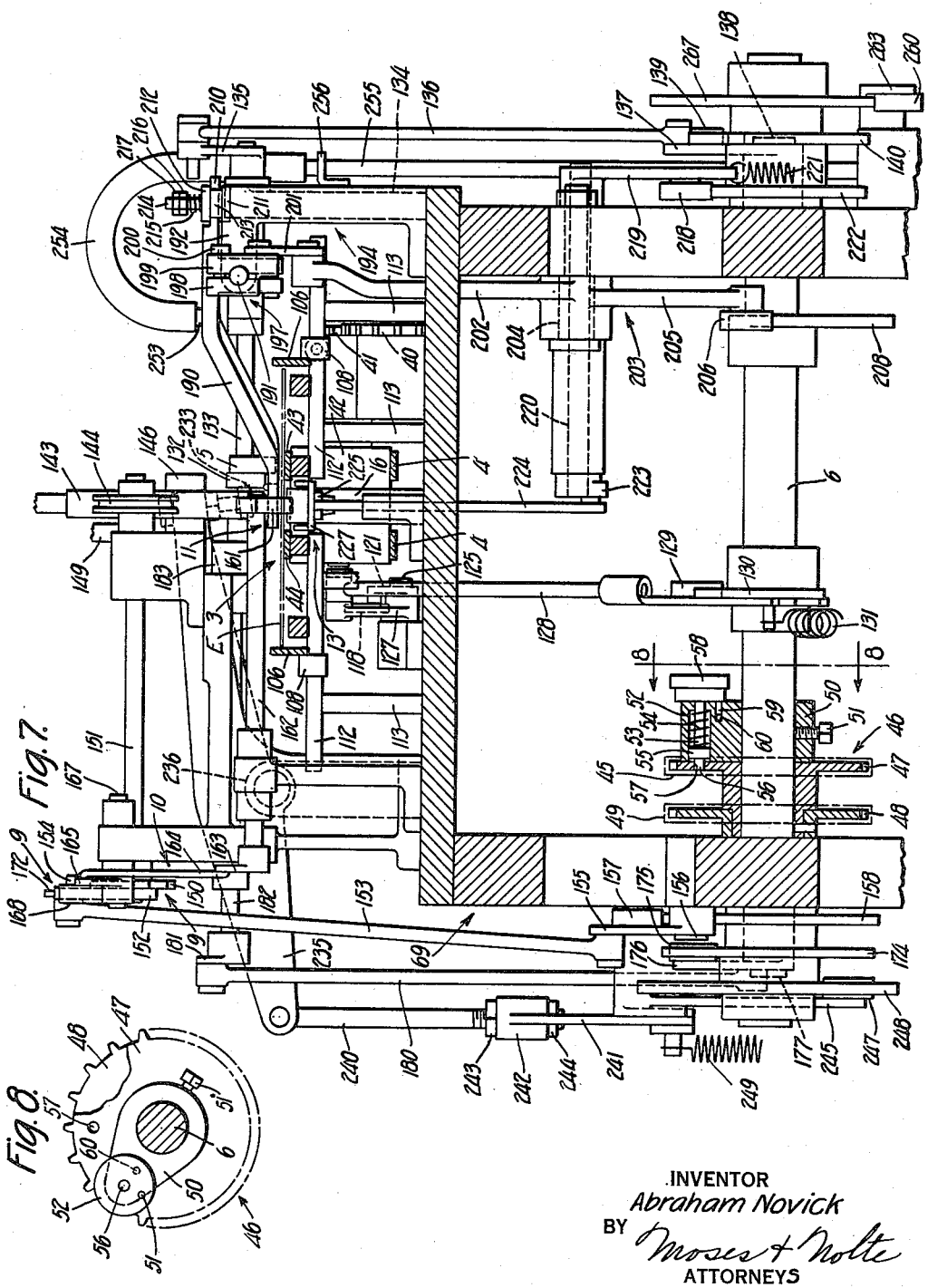
INVENTOR
Abraham Novick
BY Moses & Nolte
ATTORNEYS

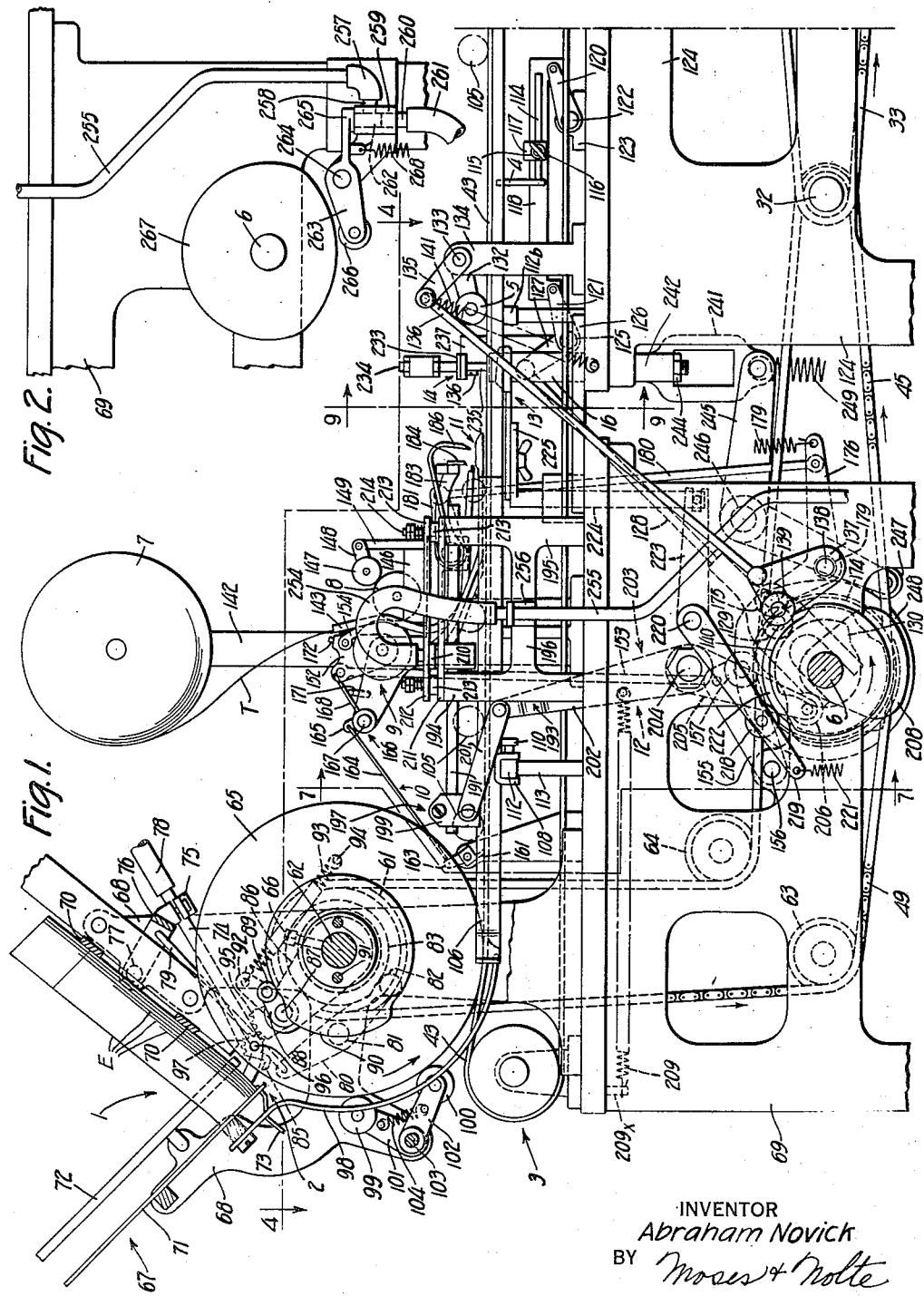

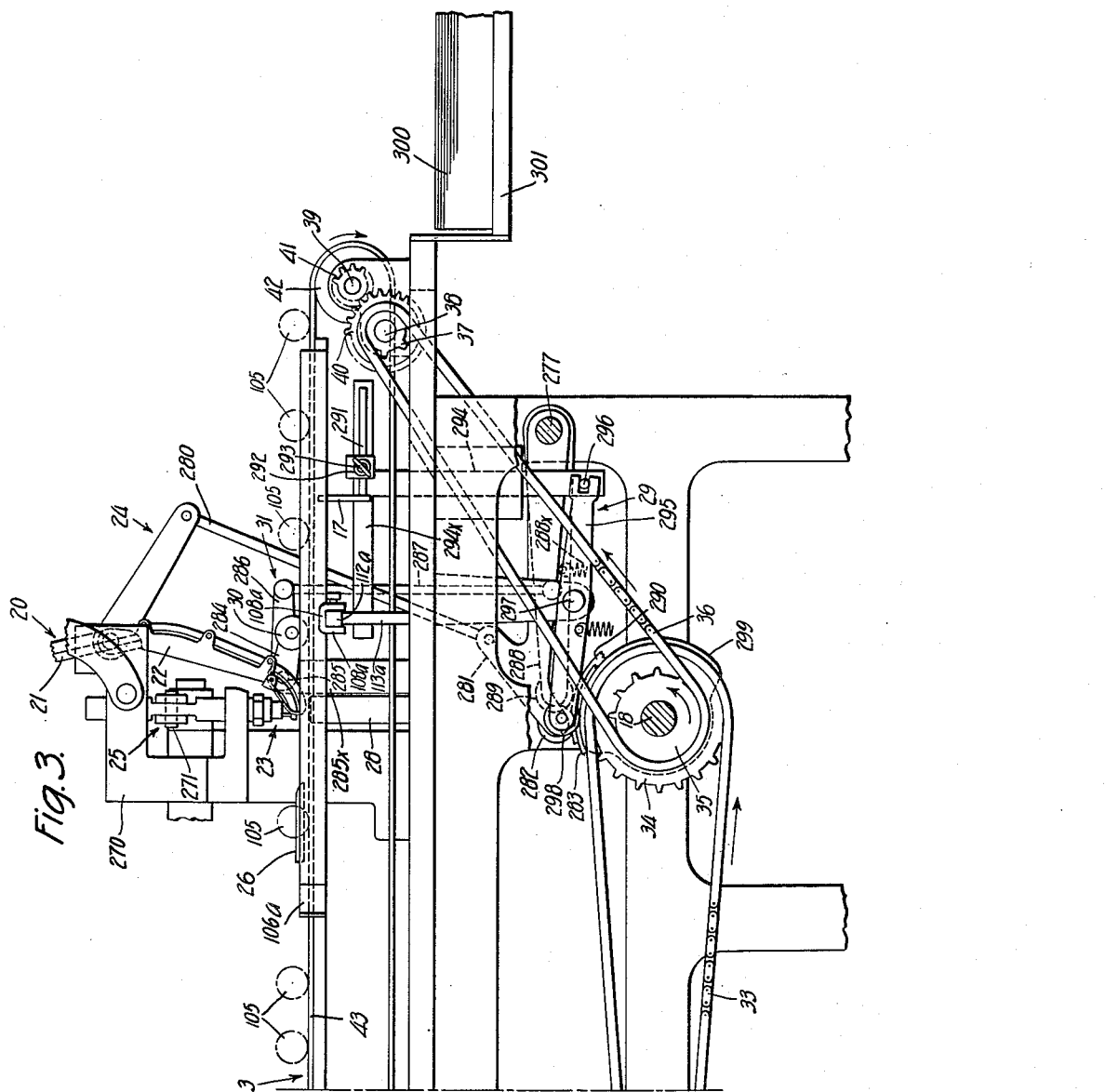

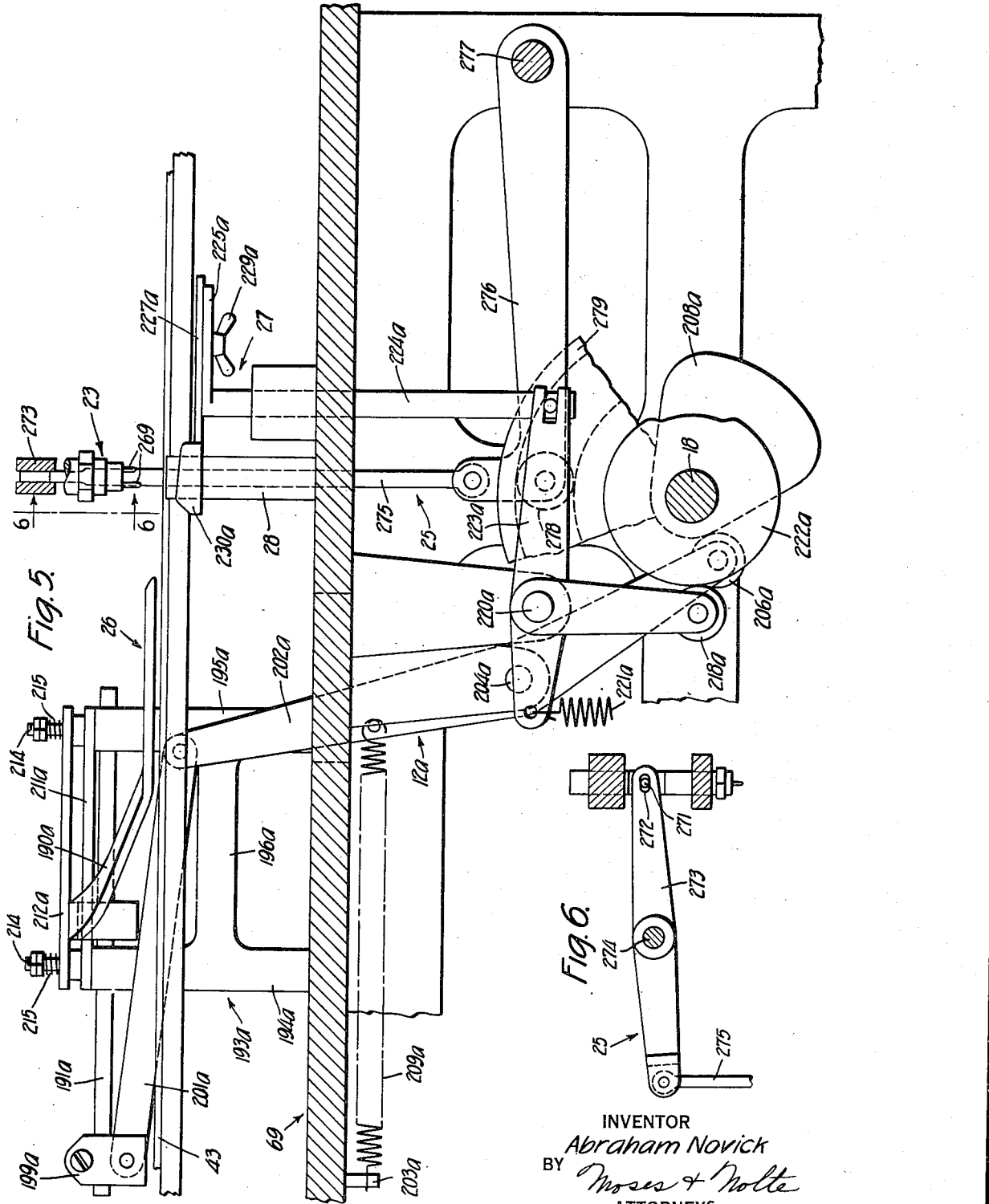

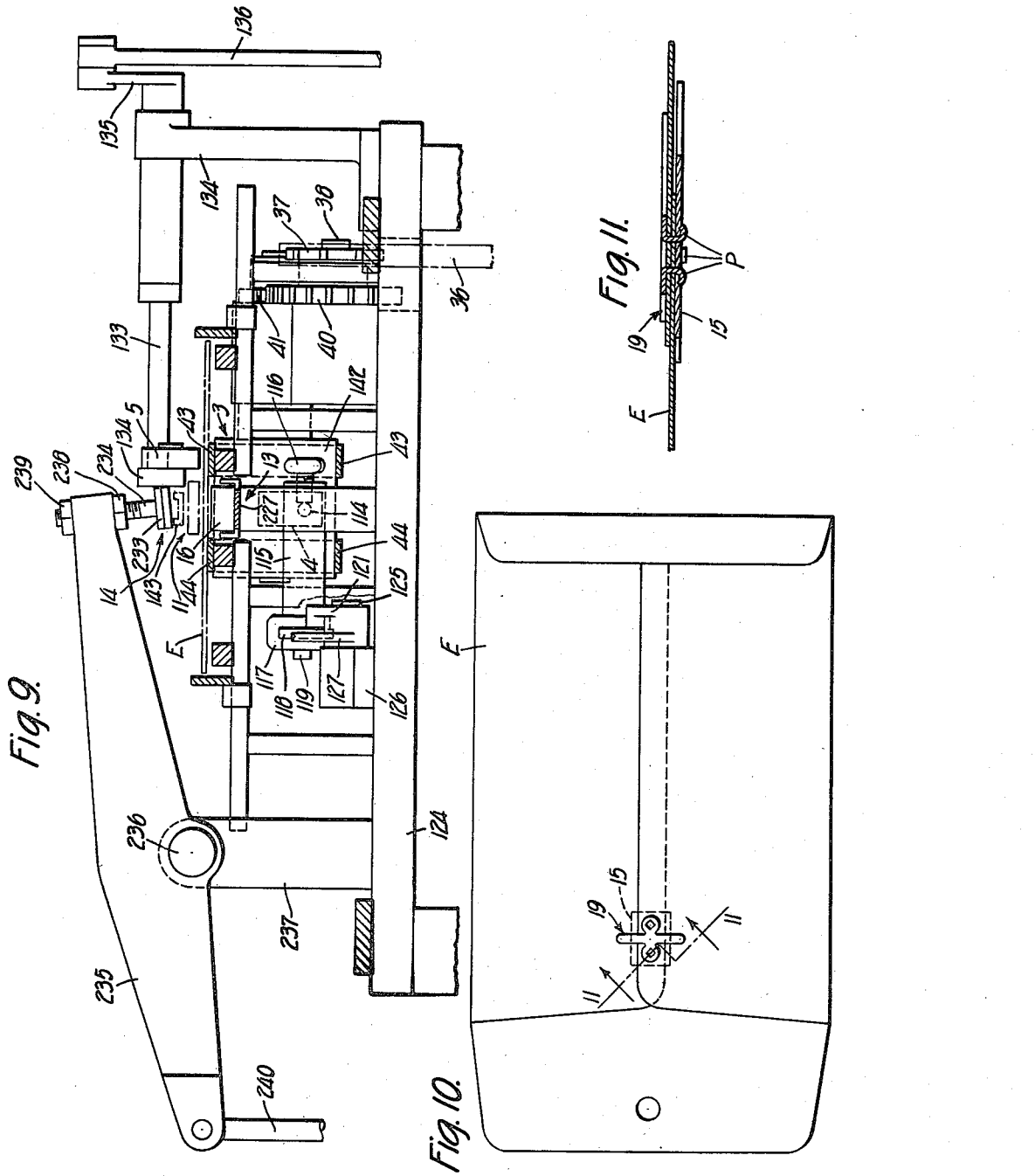

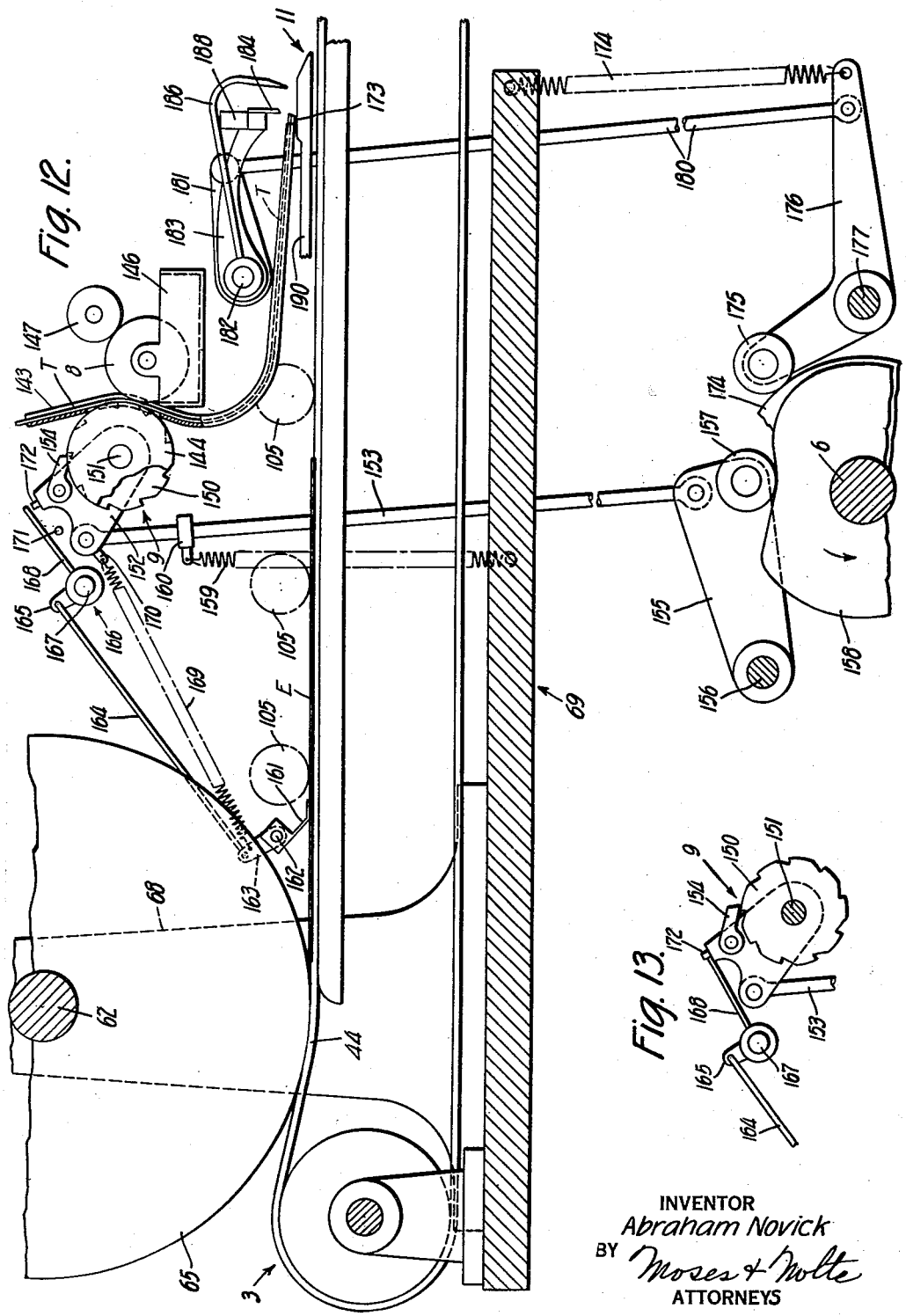

Jan. 13, 1942.  A. NOVICK  2,269,954
ENVELOPE MACHINE
Filed March 23, 1939  10 Sheets-Sheet 8

INVENTOR
Abraham Novick
BY Moses + Nolte
ATTORNEYS

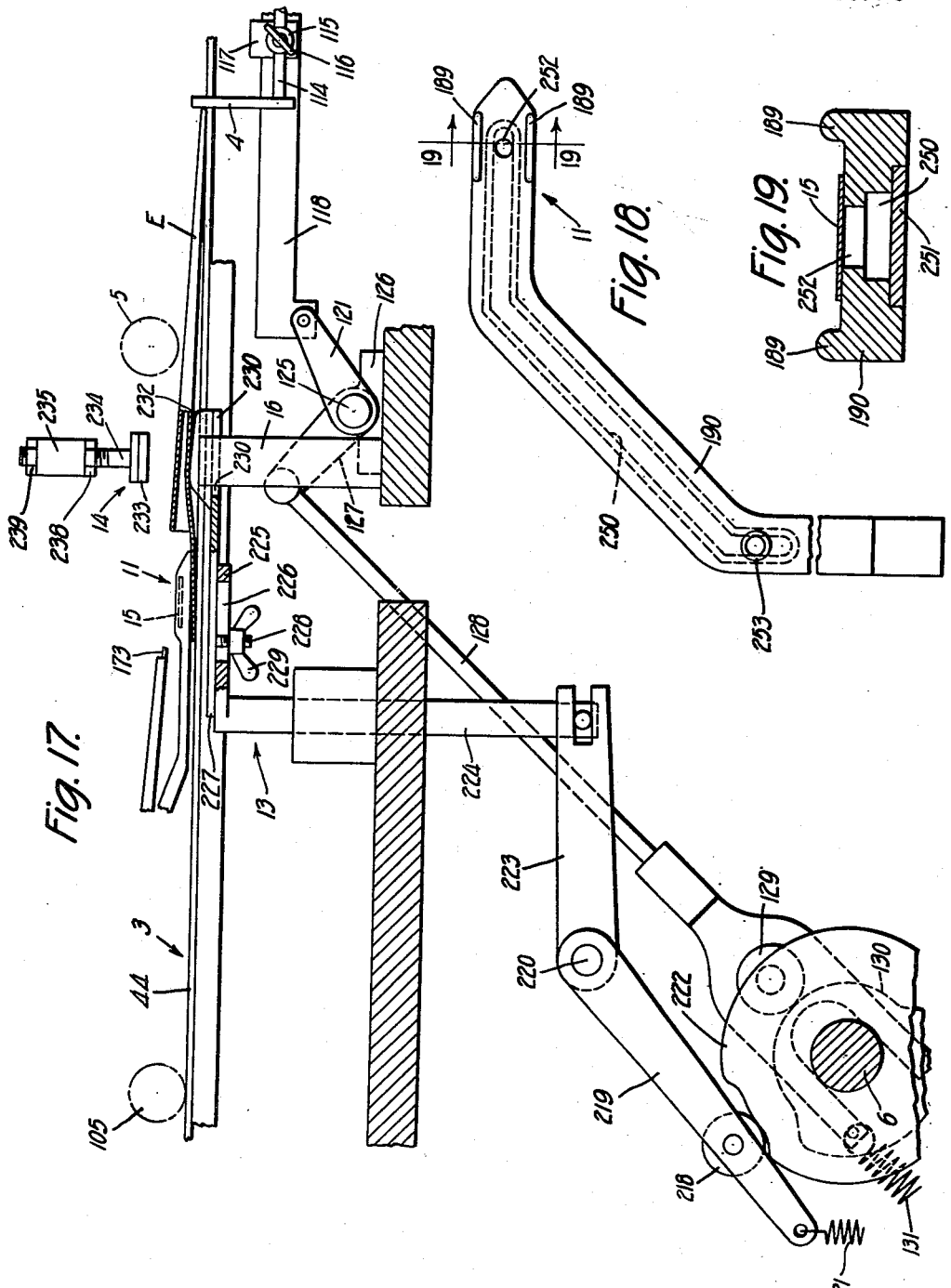

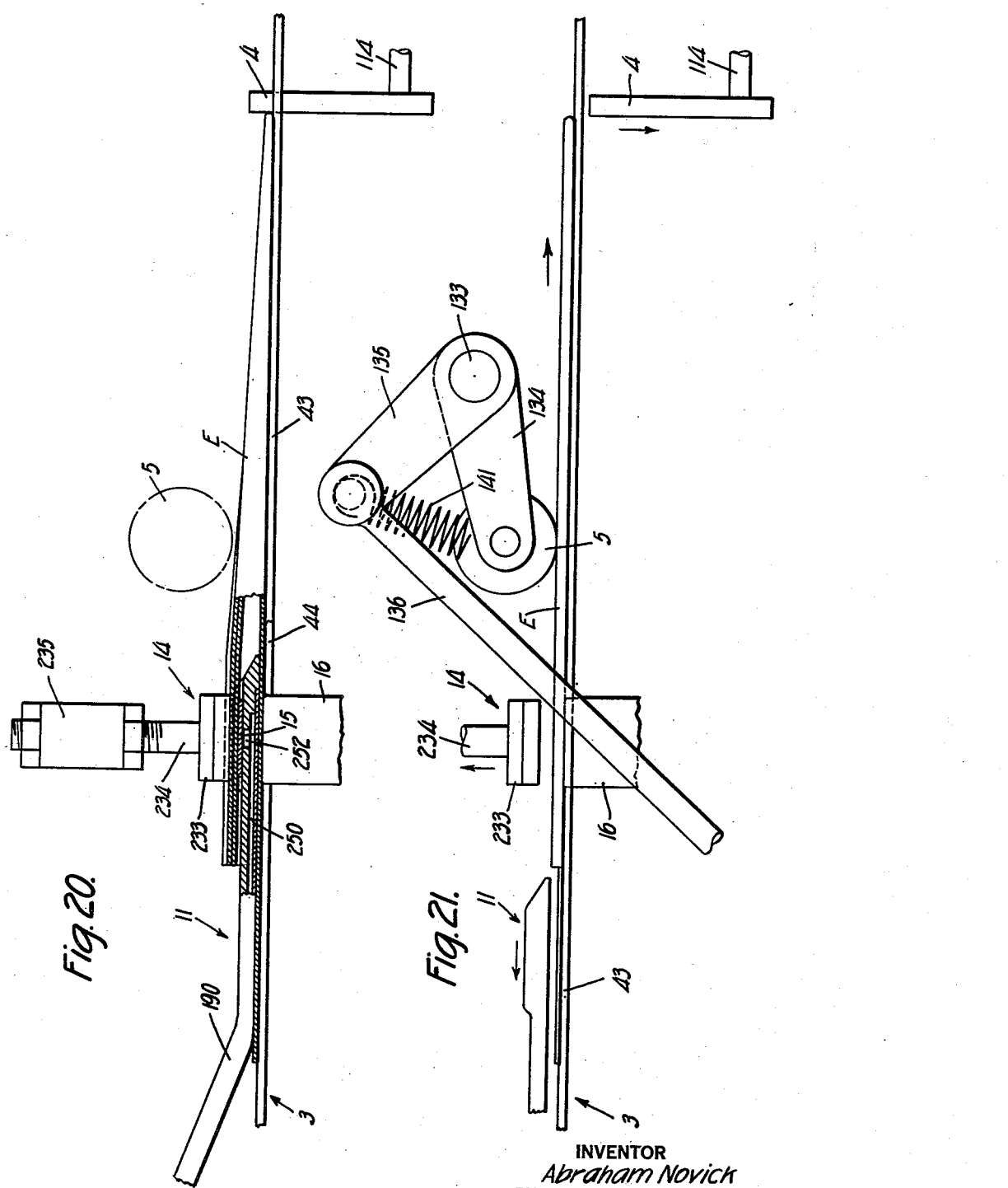

Patented Jan. 13, 1942

2,269,954

UNITED STATES PATENT OFFICE 2,269,954

ENVELOPE MACHINE

Abraham Novick, Flushing, N. Y., assignor to F. L. Smithe Machine Co., Inc., New York, N. Y., a corporation of New York Application March 23, 1939, Serial No. 263,626

23 Claims. (Cl. 93—61)

This invention relates to a machine for making envelopes of the clasp fastener type, and more particularly to a machine which may be used to provide a reinforced attachment of the clasp fastener to the envelope body.

Broadly, clasp fastener envelopes are well known and widely used. As generally made, the envelope comprises a clasp fastener clinched to the outer face of the back of the envelope. A popular form of fastener comprises a central body portion having bendable arms extending in opposite directions from it and anchoring legs extending in opposite directions from the central body portion and at right-angles to the arms. The legs are provided with clinching prongs for attachment to the back of the envelope body. The arms lie flat against the back of the envelope as delivered to the user, and the user bends the arms into parallelism, passes them through an opening formed in the closure flap of the envelope, and then bends them down substantially to their original positions, thereby locking the envelope flap in envelope closing position.

It is sometimes desirable to apply this type of closure means to an envelope made of light paper stock. When this is done in the usual way, the clasp fastener is apt to tear loose from the back of the envelope body so that the construction is apt to be unsatisfactory and undependable.

In my pending application Ser. No. 207,436, filed May 12, 1938, for Envelope construction, now Patent No. 2,206,044, disclosure is made of an envelope of the clasp fastener type in which a patch of strong flexible paper is adhesively united to the inner face of the back of the envelope body in position to receive the fastener prongs, and the fastener is clinched to the reinforced area by passing the prongs through the overlapping plies which form the center seam of the envelope back and through the reinforcing path. The construction referred to overcomes the defect found to exist in prior light weight envelopes of the clasp fastener type.

It is a primary object of the present invention to provide a machine capable of applying the patches and fasteners to envelopes in the manner just described; that is to say, a machine capable of first adhesively applying a patch to the inner face of the back of the envelope body and of thereafter attaching a fastener by driving the fastener prongs through the envelope body and the reinforcing patch and upsetting the prongs.

It is a further object of the invention to provide a machine capable of making reinforced clasp envelopes as referred to in the preceding paragraph, but also capable of readjustment in a simple and expeditious manner to make unreinforced clasp envelopes. All of the features of the invention disclosed herein are useful in connection with the making of reinforced clasp envelopes as described, but a number of these features are also useful in other connections. One type of clasp fastener envelope, for example, comprises a clasp fastener clinched to the back of the envelope and a protective patch adhesively united to the inner face of the back of the envelope for covering the prongs of the fastener to protect the contents of the envelope against possible injury by the fastener prongs. Features of the present invention which have to do specifically with the application of a patch to the inner side of the back of an envelope body have utility in connection with the manufacture of envelopes of the class just referred to. From that point of view, such features may be regarded as improvements upon the machines disclosed and claimed in my pending application Ser. No. 142,393, filed May 13, 1937, for Envelope fastener machines, now Patent No. 2,197,827, and Ser. No. 151,463, filed July 1, 1937, for Patch applying machines and envelopes made thereby, now Patent No. 2,197,826.

In accordance with one such feature of the invention, the patch tape is advanced step by step to a cutting position for the cutting off of a patch from the leading end of the tape in position to be deposited upon a movable anvil which is insertable into the envelope. A holddown device or needle is mounted coaxially with the movable knife member to engage the leading end of the web before the patch is cut off. The needle is controlled in its movements by the movable knife carrier and the anvil, and constitutes a very simple and effective means for causing the patch to be definitely and accurately deposited upon the anvil. Besides being of simple and inexpensive construction, the needle constitutes an ideal presser member because it engages such a small area of the tacky adhesive on the face of the patch, and hence has little or no tendency to displace the patch from the anvil when it is withdrawn.

A further feature has to do with the provision of a traveling anvil adapted to hold the patch to itself by suction while it is carrying the patch into position to be applied to the envelope. To this end the anvil is provided with a suction passage which terminates in an open port located in the patch seat of the anvil. A suitable source of suction is provided, and a timed valve mechanism controls the communication of the anvil passage with the source of suction and with the atmosphere in properly timed relation with the operation of the other parts of the machine to cause the suction in the anvil to be broken when the envelope material has been pressed against the tacky face of the patch.

A further feature of the invention has to do with the provision of a traveling anvil which is yieldingly and tiltably mounted to adapt it to travel in a straight path when carrying the patch into the envelope body and then to yield downward for a limited distance when pressure is applied to the exterior of the envelope body for pressing the back of the envelope body against the tacky face of the patch.

Other objects, features and advantages will hereinafter appear.

In the drawings forming part of this specification and illustrating a practical and advantageous embodiment of the invention:

Figure 1 is a view in side elevation of a portion of the machine, partly in section;

Figure 2 is a fragmentary detail view illustrating particularly the mechanism for controlling the communication of the anvil passage with the source of suction and with the atmosphere;

Figure 3 is a view in side elevation, partly in section, of another portion of the machine which is complementary to Figure 1 and which, when placed end to end with Figure 1, constitutes a showing of the machine substantially in its entirety;

Figure 5 is a fragmentary view in sectional side elevation, showing particularly a portion of the operating mechanism at the fastener applying station;

Figure 6 is a fragmentary, detail, sectional view taken on the line 6—6 of Fig. 5 and showing particularly a portion of the operating means for the fastener driver;

Figure 7 is a fragmentary, transverse, vertical, sectional view taken on the line 7—7 of Figure 1 looking in the direction of the arrows;

Figure 8 is a sectional detail view, taken on the line 8—8 of Figure 7, partly broken away, and illustrating particularly the means whereby the patch applying section of the machine may be rendered operative or inoperative at will;

Figure 9 is a fragmentary transverse vertical sectional view taken on the line 9—9 of Figure 1 looking in the direction of the arrows;

Figure 10 is a plan view of the back of a clasp fastener envelope having a clasp fastener and a reinforcement applied as the machine is adapted to apply them;

Figure 11 is a fragmentary sectional view taken on the line 11—11 of Figure 10 looking in the direction of the arrows;

Figure 12 is a sectional, detail view illustrating particularly features connected with the feeding and cutting off of the patch tape;

Figure 13 is a fragmentary detail view illustrative of a certain feature of operation of the patch tape feeding means;

Figure 17 is a fragmentary detail view illustrating particularly features connected with the opening of the envelope mouth for reception of the anvil in patch applying position;

Figure 18 is a detail plan view of the traveling anvil, the anvil being broken away intermediate its ends for compactness of illustration;

Figure 19 is a detail sectional view taken on the line 19—19 of Figure 18 looking in the direction of the arrows, Figure 19 being on a larger scale than Figure 18;

Figure 20 is a fragmentary view in side elevation, and partly broken away, illustrating the pressing of a patch against the inner face of the envelope body; and Figure 21 is a view generally similar to Figure 18 showing the parts immediately after the patch has been pressed against the envelope body.

Figure 4:
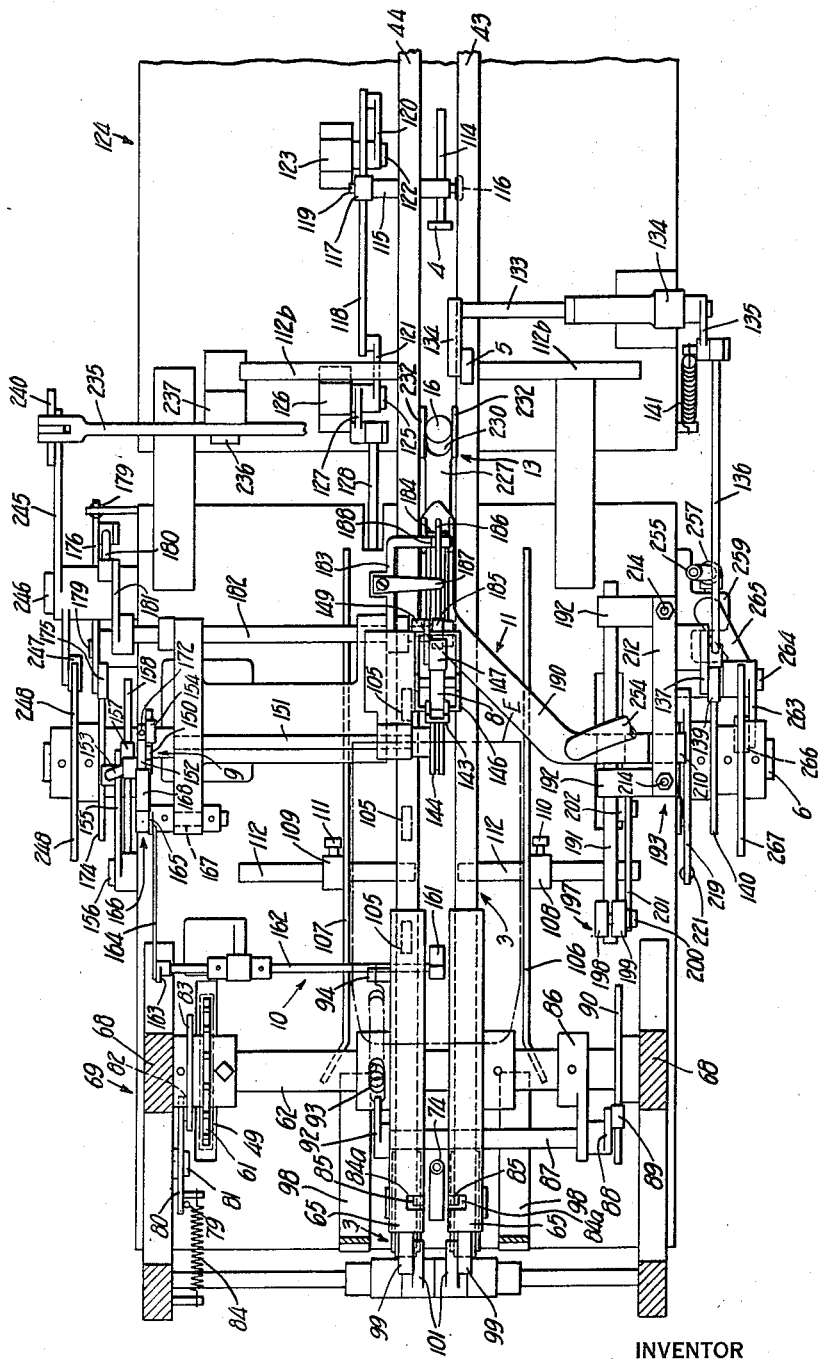
Figure 4 is a fragmentary sectional plan view taken on the line 4—4 of Figure 1 looking in the direction of the arrows.

Before describing the parts of the machine in detail, the principal or major units will be referred to briefly for the purpose of giving a comprehensive idea of the nature, purpose and mode of operation of the illustrated machine.

Envelopes E are taken one by one from a stack 1, Figure 1, by means of separator mechanism indicated generally at 2. The blanks are delivered at uniform intervals, with their seal flaps open, to a belt conveyor 3, see Figure 4 also, which runs constantly at uniform speed. Each blank is arrested at a patch applying station for a patch applying operation by means of a retractible stop 4. A feed roller 5 cooperative with the belt conveyor is controlled from a cam shaft 6, being held away from the belt conveyor 3, while the blank is arrested by the stop 4, but becomes instantaneously effective upon the retraction of the stop 4 at the completion of the patch applying operation.

Figure 16:
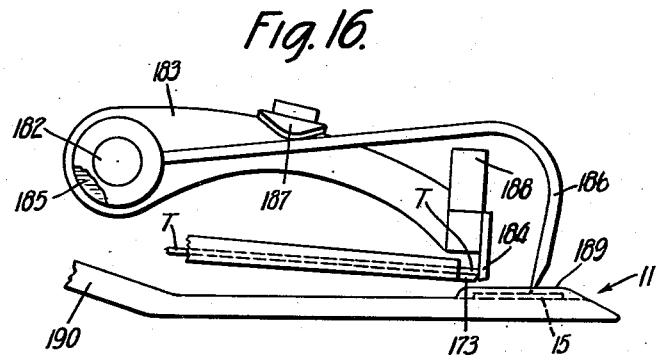

The patch material is supplied from a reel 7 of adhesive tape T, the tape being fed with its gummed side in engagement with a moistening roller 8. The gummed tape is advanced step by step by means of pawl and ratchet mechanism 9, shown in Figures 1, 4 and 7, which is operated from the cam shaft 6. A feeler mechanism 10 is provided for rendering the mechanism 9 ineffective to feed a patch length when an envelope fails to come through on schedule. The patch web material is fed out over a traveling anvil 11 as in Figure 14, being cut off to form a patch 15 which is deposited on the anvil and held to the anvil by suction, as in Figure 16. The anvil is adapted to be retracted to the Figure 1 position for receiving the patch 15, and then to be advanced into the envelope, as illustrated in Figure 18, for delivering the patch 15 into position to be applied to the inner face of the back of the envelope body. The reciprocation of the anvil 11 is controlled from the cam shaft 6 by means of mechanism indicated generally at 12.

As the anvil advances, a lifter mechanism 13, Figure 1, which is operated from the cam shaft 6, is thrust upward to assure entry of the anvil within the envelope. When the patch 15 has been carried into the envelope to the position indicated in Figure 20 by the anvil, a presser 14 descends, as indicated in the same figure, to press the back of the envelope body down against the patch 15. The anvil 11 is yieldingly held up and is rockingly mounted so that it may retreat a short distance in response to the force exerted by the presser 14 until positively arrested by a stationary supporting anvil 16.

As soon as the patch pressing operation illustrated in Figure 20 has been performed, the anvil 11 and the presser 14 retreat. The stop 4 withdraws from the path of the envelope, and the feed roller 5 snaps down against the envelope, as in Figure 21, to cause the envelope E to be quickly and positively fed away from the patch applying station, so that it cannot interfere with the next following envelope, and is, itself, advanced in proper time to a patch supplying station.

The belt conveyor 3 carries the envelope E forward until it is arrested at the fastener applying station (see Figure 3) by means of a retractible stop 17 which is similar to the retractible stop 4, and which is operated from a cam shaft 18. Clasp fasteners 19 of the type illustrated in Figure 10 are fed downward, for application to the back of the envelope body and to the adhered patch 15, through a magazine or chute 20 which comprises an upper stationary section 21 and a lower oscillating section 22. The lower section 22 is oscillated into and out of register with a fastener driver 23 by means of mechanism 24 which is operated from the cam shaft 18. The driver 23 is also operated from the cam shaft 18 by means of mechanism indicated generally at 25, Figures 3, 5 and 6.

A reciprocable anvil 26, Figures 3 and 5, is provided to enter the envelope and turn the prongs P, Figure 11, of the clasp fastener 19 at the clinching operation. This anvil 26 is operated from the cam shaft 18 by mechanism which is desirably a substantial duplicate of the mechanism 12 for operating the anvil 11. The anvil 26 itself, which does not carry a patch, is not provided with suction means and has the end of its upper face appropriately formed to receive and turn the fastener prongs. Lifting mechanism 27, Figure 5, is provided for assuring entry of the anvil 26 into the envelope, this mechanism being a substantial duplicate of the lifting mechanism 13 and being operated from the cam shaft 18. A stationary anvil 28 is provided for limiting the retreat in a downward direction of the anvil 26 as the driver 23 descends.

Provision is desirably made of feeler mechanism (not shown) for preventing movement of the movable magazine section 22 into position to deliver a fastener to the driver when an envelope fails to come through on schedule. This feeler mechanism is desirably the same as that shown and described in my above-mentioned pending application Serial No. 142,393.

Mechanism 29 is provided for operating the stop 17 from the cam shaft 18 in proper timed relation with the other operating parts located at the fastener applying station. A feed roller 30 is operated by mechanism 31 from the cam shaft 18 in a similar manner that the feed roller 5 is operated from the cam shaft 6.

It will be observed that all of the timed mechanism which operates at the patch applying station is driven and controlled from the cam shaft 6, and that all of the timed mechanism operating at the fastener applying station is driven and controlled from the cam shaft 18.

While the illustrative machine is especially adapted to perform the patch applying and fastener applying operations in succession, it is a very important point that the machine is also adapted to apply fasteners to envelopes which do not require a reinforcing patch, or, in other words, that the machine can be used to apply fasteners with or without patches. The arrangement whereby this flexibility of operation is secured will now be briefly described.

All of the illustrated mechanism is operated from a common drive shaft 32, Figure 1. The shaft 32 is connected through a chain 33 and a sprocket 34, Figure 3, fast upon the shaft 18 to drive the latter shaft. The shaft 18 has fast upon it a sprocket 35 which, through a chain 36, drives a sprocket 37 fast upon a shaft 38. The shaft 38 drives a shaft 39 through gears 40 and 41 which are fast upon the respective shafts. The shaft 39 has fast upon it a pulley 42 for driving two spaced belts 43 and 44 which make up the belt conveyor 3, see Figure 9 also.

The shaft 32 also acts through a chain 45, Figure 1, to drive a sprocket unit 46, Figures 7 and 8, which is revolubly mounted upon the shaft 6. The sprocket unit 46 comprises two sprockets 47 and 48 which are fast with one another. The chain 45 runs upon the sprocket 47 to drive the unit, while a further chain 49 is driven by the sprocket 48 for a purpose presently to be pointed out.

A collar 50 is made fast on the shaft 6 alongside the sprocket 48 by means of a set screw 51, the collar being angularly adjustable about the axis of the shaft 6. The collar is formed with an extension portion in which a bore 52 is provided. A plunger 53 is mounted in the bore 52 and is urged toward the sprocket 48 by means of a compression coil spring 54 which is interposed between a collar 55 on the plunger 53 and the base of the bore 52. The plunger tip 56 is adapted to enter and fit substantially an aperture 57 formed in the sprocket 48 for establishing a driving connection between the sprocket 48 and the shaft 6.

The end of the plunger opposite the tip extends through the base of the bore 52 and has a head or operating knob 58 affixed to it. The under face of the head 58 bears against the collar 50 in the position of the parts illustrated in Figure 7. The head 58 carries a pin 59 which is adapted to fit into a recess 60 formed in the collar 50. When it is desired to disable the shaft 6, the head 58 is simply pulled toward the right, as viewed in Figure 7, for a sufficient distance to withdraw the pin 59 from the recess 60, and is then turned to move the pin 59 out of alignment with the recess 60 so that the end of the pin bears against the face of the collar 50. The tip 56 of the plunger 53 is thus retracted from engagement with the sprocket 48, and is maintained in its retracted position, so that the shaft 6 and the parts normally operated and controlled by that shaft may remain idle while the operation of the sprocket unit 46 is continued.

The drive of the chain 49 by the sprocket 48 is not interrupted by the disabling of the shaft 6. The chain 49 is connected to drive a sprocket 61 fast upon a shaft 62, being guided to the sprocket by idler guide sprockets 63 and 64, Figure 1. The shaft 62 has fixed upon it a pair of feeding disks 65, Figs. 1 and 4, which form elements of the blank separating mechanism 2. The shaft 62 also has fast upon it cam mechanism for operating and controlling the other separator mechanism in proper timed relation to the other parts of the machine.

The correct timing of the separator mechanism with respect to the fastener applying mechanism is not the same, however, when the patch applying mechanism is in operation as it is when the patch applying mechanism is cut out of operation. In the one instance the envelopes go straight through from the separator mechanism 2 until arrested by the stop 17, while in the other instance the travel of the envelopes is interrupted by the stop 4 for the application of a reinforcing patch.

Provision is accordingly made of suitable means for adjusting the sprocket 61, Figures 1 and 4, which drives the separator mechanism 2 relatively to its driving shaft 62. For this purpose the sprocket 61 is revolubly mounted upon the shaft 62, but is adapted to be made fast to the shaft in any adjusted position desired by means of a set screw 66 which is adapted to be threaded through a hub portion of the sprocket 61 into binding relation with the shaft 62. Since this adjustment does not disturb the timing of the separator parts with relation to one another, but only the timing of the separator as a whole with reference to the fastener applying unit as a whole, it will be evident that the required readjustment of timing can be very readily effected by means of a single and very simple operation.

While the foregoing description is designed to indicate, in a general and comprehensive way, the organization of the illustrative machine, the nature and function of the principal operating units, and the relation of those units to one another, it does not purport even to make general reference to all of the operating instrumentalities, nor to refer to all of the novel features embodied in the machine.

The envelope stack 1 is supported in an inclined attitude in a magazine 67 which is carried by frame standards 68, the standards in turn being supported upon one of the main frame units 69 of the machine. The magazine comprises floor bars 70 upon which the lowermost envelope of the stack rests, bottom plates 71 against which the bottom edges of the envelopes rest, and side rails or guides 72 for engaging the opposite side edges of the stack. A stripper finger 73 extends under the lower edge of the stack and normally engages the extreme lower edge portion of the lowermost envelope.

A sucker tube 74 is secured by a clamp 75 to a rocking bail 76, the bail being pivoted upon the standards 68 at 77. The sucker tube 74 is maintained in communication with a suitable source of suction through a flexible hose 78. The bail is rocked or oscillated to carry the mouth of the sucker tube toward and away from the lower marginal portion of the lowermost blank of the stack 1. In the position illustrated in Figure 1 the mouth of the suction tube is pressed against the margin of the lowermost blank. As the bail is rocked in a counter-clockwise direction, as viewed in Figure 1, the sucker tube is carried downward to pull the bottom edge of the lowermost blank past the stripper finger 73 and clear of the edges of the plates 71 into position to be seized and drawn away from the stack.

The bail 76 is oscillated by a link 79, Figures 1 and 4, which is pivotally connected at one end to the bail 76 and at its opposite end to a rocking lever 80. The lever 80, is rockably mounted upon a fulcrum stud 81, fast on one of the standards 68, and carries a cam follower roller 82 at its end remote from the link 79. The follower 82 runs upon a cam 83 which is fast upon the shaft 62. A tension spring 84, shown only in Fig. 4, is connected to the lever 80 to maintain the follower 82 in engagement with the cam 83.

The suction tube 74 operates between the feeding discs 65 and acts to carry the suction-held lower margin of the lowermost blank down against the peripheries of the feeding discs 65. Each of the discs 65 is formed with a notch 84a, Fig. 4, in its periphery through which a gripper 85, see Figure 1 also, is adapted to be projected. The grippers 85 are carried by their respective discs 65 and are caused to arrive in envelope-receiving positions and to be operated in proper timed relation with the operation of the suction tube 74 to grip the bottom end of the envelope against the discs 65.

The shaft 62 has fast with it an arm 86 which carries one end of a rock shaft 87. The rock shaft 87 has fast upon it a crank arm 88 which carries a cam follower 89. The cam follower co-acts with a stationary cam 90 which is mounted upon the shaft 62 but which is held against rotation by means of pins or bolts 91 that connect it with the frame standards 68. The rock shaft 87 also has fast upon it a second crank arm 92 which is connected through a tensioned coil spring 93 with a fixed pin 94 on one of the discs 65, the spring serving to draw the follower 89 against the cam 90. The rock shaft 87 passes through the two discs 65 and carries in association with each of the discs a gear segment 95 for operating one of the grippers 88. Each gripper 88 is pivotally mounted upon a stub shaft 96 which is carried by its feed disc 65 near the periphery of the disc, and each gripper has a toothed portion 97 which forms a gear segment for cooperation with the teeth of the associated segment 95. The follower 89 is shown in Figure 1 as about to pass from the low to the high part of the cam 90. As it does so, the gear segment 95 is turned counter-clockwise about the axis of the rock shaft 87 and causes the grippers 85 to swing quickly in a clockwise direction so that they are projected through the notches 84ª and into the position to grip the envelope margin firmly against the peripheries of the feed discs 65. Since the feed discs 65 are constantly driven at the uniform speed of the shaft 62, they draw the envelope downward away from the stack 1 and toward the belt conveyor 3.

Stationary curved guide bars 98 assist in guiding the envelope during this movement. The leading or lower margin of the envelope, however, is carried beneath pressing rollers 99 and 100, which are carried, respectively, upon arms 101 and 102. Both of the arms 101 and 102 are loosely mounted upon a shaft 103, and the arms are connected to one another by a tension spring 104 which tends to draw the arms toward one another, and hence to press both rollers against the periphery of the associated feed disc 65. When the envelope has become gripped to the feed discs 65 by the rollers 99 and 100, the grippers 88 are permitted by the cam 90 to be retracted within the peripheries of the feed discs by the spring 93, as will be evident from an examination of Figure 1.

The feed discs 65 bear against the belts 43 and 44 of the conveyor 3, and travel at a peripheral speed equal to the linear speed of the belts. Feed rollers 105 are disposed at intervals for co-operation with the belts so that the envelopes are positively advanced away from the feed discs 65.

Guide bars 106 and 107, Figure 4, are provided at opposite sides of the belts to serve as side guides for the envelopes. The bars at the receiving end adjacent the discs 65 are bent outward, Figures 1 and 4, so that the bars jointly provide a flaring mouth for facilitating the accurate introduction of the envelopes between the parallel portions of the bars. The bars 106 and 107 are provided, respectively, with brackets 108 and 109, Figures 1, 4 and 7, which are secured by set screw 110 and 111 to supporting rods 112 which are mounted upon a stationary post 113.

The envelope delivered to the belt is transmitted at the uniform speed of the belt to a position in which it is arrested by engagement with the stop 4. The stop 4 holds the envelope stationary in patch applying position. The stop 4 is fixed upon one end of a supporting rod 114. The rod 114 passes through an end portion of a transverse rod 115, Figures 1, 4, 9 and 17, and may be clamped in various positions of lengthwise adjustment by means of a set screw 116 which is threaded into the end of the rod 115. The rod 115, in turn, is formed with an enlarged portion 117 at its opposite end to embrace a supporting link 118. The rod 115 may be clamped in various adjusted positions along the link 118 by means of a set screw 119 which is threaded into an end of the rod. The link 118 is pivotally connected at its opposite ends to parallel rocker arms 120 and 121. The rocker arm 120 is mounted upon a headed stud 122 fast on a bracket 123 carried by a main frame member 124. The arm 121 is fast upon a headed stud 125 fast on a bracket 126 carried by the frame member 124. An arm 127 rigid with the arm 121 is pivotally connected to a yoke 128 which embraces the cam shaft 6. The yoke 128 carries a cam follower 129 which coacts with a cam 130, fast on the cam shaft 6. A spring 131, Figures 7 and 17, connected to the yoke 128 urges the follower 129 toward the cam 130. The cam 130 is so constructed and designed that the stop 4 is caused to be projected up across the path of the envelope and held stationary there for a sufficient time to intercept the envelope and hold the envelope stationary for the patch applying operation.

There is no roller 105 opposed to the belts 43 and 44 in the area which the longest envelope would occupy when arrested by the stop 4, as in Figures 17 and 20. In this space, however, the feed roller 5 is provided. The feed roller 5 is operated in timed relation to the operation of the stop 4, being rendered inactive before the envelope is arretsed by the stop 4, and caused to resume engagement with the envelope as the stop 4 retreats.

The roller 5 is carried by an arm 132, Figures 1, 4, 7 and 21, fast on a rock shaft 133. The rock shaft 133 is journaled in a stationary post 134. The shaft 133 has also fast upon it an arm 135 which is connected through a link 136 to a rocking lever 137. The lever 137 is mounted upon a headed stud 138, on the machine frame 69, and carries a cam follower 139, which runs in engagement with a cam 140 fast on the cam shaft 6. The cam 140 is so constructed and designed that it will cause the roller 5 to operate in a manner and at the times previously stated. A tension spring 141 is connected to the arm 135 and acts to maintain the follower 139 in engagement with the cam 140.

Patch web material is advanced step by step from the reel 7, Figure 1, of gummed tape which is supported upon a standard 142. The web is guided by means of a guide chute 143 between feed rollers 8 and 144. The feed roller 8 is a moistening roller for engaging the gummed side of the tape. This roller is mounted to revolve in a tank 146, see Figure 4 also. The moisture spreading roller 147 is carried by an arm 148 pivoted on a standard 149, and runs in engagement with the moistening roller 8.

The feed roller 144 is driven by a ratchet wheel 150, Figures 1, 4, 7 and 12, which is mounted upon a shaft 151. A pawl carrying lever 152 is journaled on the shaft 151 and is adapted to be oscillated through a range corresponding substantially with one tooth space of the wheel 150 by means of a connecting link 153. A pawl 154, pivotally carried by the lever 152, cooperates with the wheel 150. The link 153 is connected to a rocking arm 155. The arm 155 is mounted at one end upon a headed stud 156 and at its opposite end carries a cam follower 157. The cam follower 157 cooperates with a cam 158 fast upon the shaft 6 to rock the lever 152 to and fro through the range described and in properly timed relation with the other operating parts of the machine. A spring 159, connected to a collar 160 fast on the link 153 and to a fixed part of the machine frame 69, urges the follower 157 toward the periphery of the cam 158.

Normally, the wheel 144 is advanced one tooth space of the ratchet wheel 150 at each revolution of the cam shaft 6, and this serves to feed out a sufficient length of the patch tape to constitute a single patch.

It sometimes happens, however, that through exhaustion of the envelopes in the magazine 1, or through some other cause, an envelope fails to arrive on schedule. It would be objectionable to deliver a tacky patch under such circumstances, and hence feeler mechanism is provided for suppressing the feed of the patch web in any cycle in which no envelope is delivered.

To this end, a feeler finger 161, Figures 1, 4, 7 and 12, is provided, the finger being fast upon a shaft 162 and disposed to extend down between the belts 43 and 44 and across the plane of blank feeding when no envelope is present. The shaft 162 also has fast upon it an arm 163 which is connected through a link 164 to one arm 165 of a bell crank 166 which is mounted upon a shaft 167. The other arm 168 of the bell crank 166 is adapted to act as an obstructing abutment or stop to arrest the retractive movement of the lever 152 under certain circumstances. When no envelope is present beneath the feeler 161, the feeler and the arm 163 are urged in a clockwise direction by a spring 169, Figure 12, which is connected to the arm 163 and to an ear 170 of the lever 152. Clockwise rotation of the feeler is limited, however, by engagement of the arm 168 with a fixed stop 171.

When there is a blank present beneath the feeler finger 161, as illustrated in Figure 12, the arm 168 is held up away from the stop 171 in a position like that illustrated in Figure 12. In this position the arm 168 stands clear of an abutment pin 172 which is fixed upon the lever 152, so that the lever 152 is free to execute its full retractive movement under the influence of the cam 158. As previously indicated, such full retractive movement is equal substantially to one tooth space of the ratchet wheel 150.

So long as the envelopes come through regularly, the pawl 154 is caused to advance the wheel 150 a single tooth space at each forward stroke of the lever 152. When an envelope fails to come through on schedule, however, the arm 168 is pressed down against the abutment or stop 171 and stands in position to obstruct retractive movement of the abutment pin 172. When this occurs, the lever 152 is prevented from making its full retractive movement, being arrested on its retractive stroke before the pawl 154 has been drawn back far enough to engage a fresh tooth of the wheel 150. The following stroke of the lever 152 is, therefore, an idle stroke.

Figure 14:
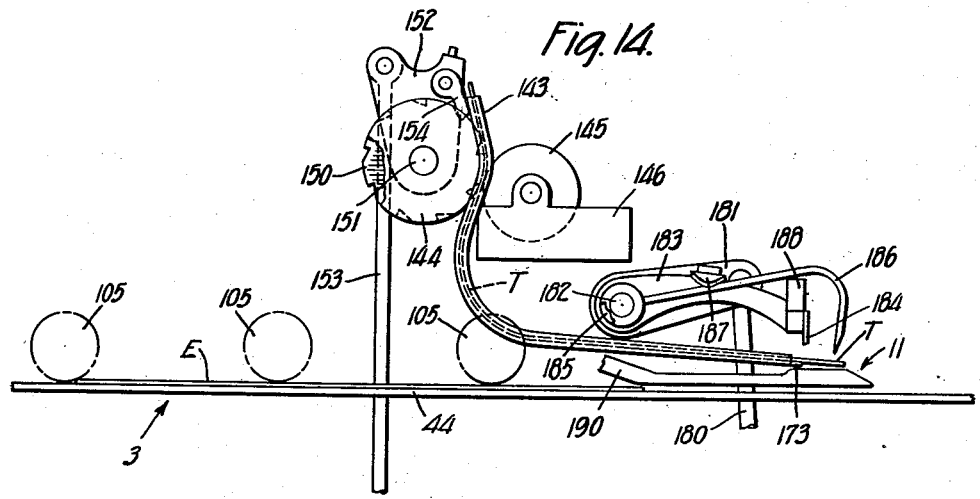
Figures 14 to 16 are fragmentary views illustrating successive steps in the feeding out and cutting off of a patch and the delivery of the patch to the traveling anvil.

The patch web, when fed in the normal manner, is advanced a patch length at each feeding step, a portion of the patch material being fed out at the delivery end of the chute 143, see Figure 14, for a distance corresponding to one patch length beyond a cutting bar 173 and over the anvil 11. Mechanism is provided for pressing the leading end of the web firmly against the upper surface of the anvil 11 and for then cutting off the patch 15 from the web of material (see particularly Figs. 1, 4 and 14 to 16). A cam 174, fast on the cam shaft 6, engages a cam follower 175 which is carried by a bell crank lever 176, the lever being pivotally mounted at its elbow upon a headed stud 177. A spring 179 connected to the bell crank lever maintains the follower 175 in engagement with the cam 174. A link 180 is connected at its lower end to the bell crank lever 176, and at its upper end to a crank arm 181 fast on a rock shaft 182. The rock shaft also has fast upon it a crank arm 183 which carries at its outer end a cutting blade 184 for cooperating with the cutting bar 173 to sever a patch. The cam 174 is constructed and arranged to oscillate the arm 183 in proper, timed relation with the other operating parts of the machine.

Figure 15:
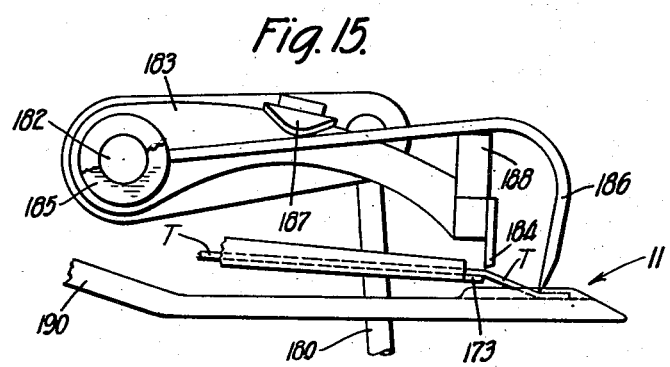

A collar 185 is revolubly mounted upon the shaft 182 and carries a curved needle 186 for engaging the leading end of the web and holding it pressed against the anvil 11, as in Figure 15, before and during the cutting operation. The needle extends beneath a leaf spring 187, which is fast to the arm 183 and normally rests upon a supporting block 188 which is carried by the outer end of the arm 183. In the normal relation of the parts, which is that of Figure 14, the leaf spring 187 holds the needle down against the block 188, and the point of the needle projects below the lower edge of the cutting blade 184, as in Figure 14, so that the needle point can engage the web and press it firmly against the anvil before the cutting blade 184 has engaged the web. This action is illustrated in Figure 15. When the needle has reached the position of Figure 15, further descent of the needle is prevented, although the arm 183 continues its downward movement. During this movement the block 188 leaves engagement with the needle 186, the leaf spring 187 yielding to permit relative movement of the arm 183 and the needle. The final position of the arm 183 and the needle is that illustrated in Figure 16, in which the blade 184 has advanced far enough to sever a patch 15 and the needle 186 is pressing the patch against the upper surface of the anvil 11. The anvil is equipped with suction means, presently to be described, for preventing dislodgment of the patch, which has thus been severed and deposited upon the anvil 11. After the suction has taken control of the patch, the arm 183 is retracted and carries the needle with it.

It is the function of the anvil 11 to carry the patch forward into the envelope and to hold it in place for application to the inner face of the back of the envelope. The anvil is formed with side flanges or ribs 189, see Figures 18 and 19, to assist in maintaining the patch accurately in place upon the anvil, and particularly to guard the patch against being displaced by engagement with the envelope back as the anvil travels forward.

The anvil 11 comprises an arm 190 which extends in an oblique direction and thence laterally of the machine, Figures 1, 4, 7 and 18. The arm 190 is clamped to a shaft 191 which is supported in arms 192 of a frame 193. The frame 193 is in the form of the letter H, see particularly Figure 1, comprising upright posts 194 and 195 and a transverse web 196. The shaft 191 also has secured to it a clamp 197 which is in the form of a split block whose arms 198 and 199 are drawn toward one another to clamp the shaft by a headed screw 200 which is passed through one of the arms and threaded into the other.

A link 201 is pivotally connected to the clamp 197 and to one arm 202 of a lever 203. The lever 203 is fulcrumed at 204. The other arm 205 of the lever 203 carries follower 206, which engages a cam 208 fixed on the cam shaft 6. A spring 209, connected to the arm 202 and to a stationary pin 209x, Figure 1, maintains the follower 206 in engagement with the cam 208. The cam 208 is constructed and arranged to cause the anvil 11 to be retracted to the position of Figure 1 for the reception of a patch 15 and to be advanced to the position of Figure 20 for carrying the patch into position to be applied to the inner face of the back of the envelope.

When the anvil has reached the position of Figure 20, the presser 14 descends to press the back of the envelope down firmly against the patch. The anvil is mounted to retreat in a downward direction in response to the force of the presser until the anvil is positively arrested by a stationary anvil member or post 16. For this purpose a tail portion 210 of the arm 190 is extended outward beyond the shaft 191 to lie between plates 211 and 212, see especially Figure 7. The plates 211 and 212 and spacing blocks 213 interposed between the plates are impaled upon the threaded stems 214 which extend upward from the posts 194 and 195. A coil spring 215 surrounds each of the stems 214 and rests upon the upper face of the plate 212 to urge it downward. The stress of each spring 215 is adjusted and fixed by means of an adjusting nut 216 and a lock nut 217, both threaded on the associated stem 214. The plate 212 normally prevents depression of the anvil 11 by engagement with the tail 210 of the arm 190. When the presser 14 descends, however, the resistance of the springs 215 is overcome so that the tail 210 is permitted to rise and the anvil 11 is permitted to descend. As the presser 14 is withdrawn above the normal level of the anvil, the anvil is restored to its normal level for retraction into position to receive another patch.

As the anvil is advanced to carry a patch inside the envelope body, it is important that the mouth of the envelope be open to receive the anvil. For this purpose the lifter mechanism 13 is provided, Figures 1, 4, 7 and 17. A cam follower 218 is carried by an arm 219 affixed to a shaft 220. A tension spring 221 maintains the follower 218 in engagement with a cam 222 fast on the cam shaft 6. A second arm 223 fast on the shaft 220 has pin and slot connection with a vertical slide or plunger 224. The slide or plunger 224 includes a horizontal shelf portion 225 having a marginal slot 226 formed in it, see Figure 17. A lifter member 227 includes a threaded stem 228 which extends downward through the slot 226 and upon which a wing nut 229 is threaded. The nut may be operated in an obvious manner for enabling the lifter member 227 to be adjusted longitudinally of the shelf 225 and to be locked in various adjusted positions.

The lifter member 227 is in the form of a flat plate which is recessed at its forward end, as shown at 230, Figure 4, to provide clearances for the stationary anvil or post 16. The lifter member 227 also includes upstanding flanges 232 at opposite sides of the stationary anvil or post 16.

The cam 222 is constructed and arranged to cause the lifter to be moved upward to a position like that illustrated in Figure 17 as the anvil 11 approaches the mouth of the envelope, as seen in Figure 17, so as to assure that the mouth of the envelope will be open to receive the anvil 11. The lifter member 227 is only held up briefly and is permitted to descend as soon as it has performed its function of insuring entrance of the anvil 11 into the envelope.

The presser mechanism 14 for pressing the back of the envelope body down against the patch 15, as illustrated in Figure 20, comprises a presser head 233 carried by a threaded stem 234, see also Figures 1, 9 and 17. The stem 234 is passed through one end of a lever 235, which lever is fulcrumed at 236 on a stationary post 237. Nuts 238 and 239 threaded onto the stem 234 below and above the lever 235 adjustably fix the stem 234 and the presser head 233 upon the lever 235. A link 240 is connected to the tail of the lever 235 for actuating the lever and the presser head. The link 240 is threaded at its lower end and is adjustably connected to a link section 241, see Figure 7 also, so that the link 240 and the link section 241 form in effect a single link which is adjustable as to length. The link section 241 is in the form of an eye member having an enlarged portion 242 at its upper side through which the threaded portion of the link 240 extends. Nuts 243 and 244 are threaded onto the link 240 at the upper and lower sides of the enlarged portion 242 for adjustably connecting the link 240 to the link section 241. The link section 241 is pivotally connected at its lower end to one arm of a bell crank lever 245 which is fulcrumed at 246 and whose other arm carries a cam follower 247 for cooperating with a cam 248 fast on the cam shaft 6. A spring 249 is connected to the lever 245 for maintaining the follower 247 in engagement with the cam 248. The cam 248 is so constructed and arranged that the presser head 233 is caused to descend to the position illustrated in Figure 20 in properly timed relation to the other operating parts, and to be thereafter retracted in time with the operation of the other parts. The stationary anvil or post 16 sustains the anvil 11 against the pressure applied by the presser 14, limiting the descent of the anvil 11.

It has been mentioned that the anvil 11 is provided with suction means for holding the patch in place as the patch is carried by the anvil from the patch severing position to the patch applying position. For this purpose the arm 190 is formed with a shouldered channel 250, Figures 18 and 19, in its lower face, the channel being closed by a sealing plate 251 as illustrated in Figure 19. This defines the suction passage or channel 250 as illustrated in dash lines in Figure 18. At one end the channel 250 communicates with an open port 252 formed in the upper face of the anvil in the patch seat area. At the opposite end the channel 250 communicates through a nipple 253 with a flexible rubber hose 254, Figures 1, 4 and 7. The hose 254, in turn communicates with a tube or conduit section 255 which is supported at its upper end in a bracket 256 affixed to the cross bar or cross web 196 of the frame member 194. The lower end of the tube 255 is connected through an elbow 257, Figures 1 and 2, and a nipple 258 with a valve body 259. The valve body 259 is connected through a nipple 260 and a flexible tube 261 with a suitable source of suction.

The valve body 259 is formed with a bore 262 which communicates with the nipples 258 and 260 and which is open at its upper end. The valve body 259 is formed with a valve seat around the upper, open end portion of the bore 262. A rocking lever 263 fulcrumed at 264 is formed at one end with a head portion 265 which is appropriately formed to constitute a valve for closing the upper end of the bore 262 to shut off communication of the bore with the atmosphere. The opposite end of the lever 263 carries a cam follower 266 which cooperates with a cam 267 fast on the cam shaft 6. A spring 268 is connected to the lever 263 as illustrated in Figure 2 for maintaining the head or valve member 265 normally pressed against its seat. The cam 267 is constructed and arranged to lift the valve off its seat after the patch has been carried into the envelope and pressed against the back of the envelope but before the retractive movement of the anvil 11 is begun, and to permit the head or valve member 265 to be returned to its seat before the next patch has been deposited on the anvil and severed from the patch web. Thus the anvil suction is on at the port 252 when the parts are in the position illustrated in Figure 15 and continuously thereafter until the parts are in the positions illustrated in Figure 20. With the parts in the positions of Figure 20 the valve 265 is raised from its seat to admit atmosphere and break the suction before the return movements of the parts as illustrated in Figure 21 has begun.

As seen in Figure 21, the presser 14 is moving upward, the anvil 11 is being retracted, the stop 4 has been retracted just clear of the path of envelope feeding and the roller 5 has descended to facilitate the rapid and accurate advance of the envelope away from the patch applying station.

The envelope is now advanced to the fastener applying station by the belts 43 and 44 and cooperating rollers 105 and 30, being arrested for the fastener applying operation by the stop 17. The roller 30 is in its raised position while the envelope is in engagement with the stop 17.

Upon the arrival of the envelope at the fastener applying station, the anvil 26 is advanced into the envelope into position to turn and clinch the prongs P, of the fastener 19, driven through the back of the envelope and through the patch 15 by the driver 23. The anvil 26 is mounted and operated in the same way as the anvil 11. The anvil supporting and operating means are substantial duplicates of the parts which operate and support the anvil 11. No detailed description is, therefore, regarded as necessary, and corresponding reference numerals have been applied to corresponding parts with the subscript *a* added in each instance, see Figure 5. The cam 208*a* for operating the anvil is fast upon the cam shaft 18.

The lifter mechanism 27, Figure 5, is the same in principle and mode of operation as the lifter mechanism 13 at the patch applying station and is provided for assuring the proper entry of the anvil 23 inside the envelope. The lifter mechanism 27 and parts associated with it will not be described in detail, but the parts have been given the same reference numerals as corresponding parts forming part of, or associated with, the lifting mechanism 13, with the subscript $a$ added in each instance. The lever arms affixed to the shaft 220a and forming parts of the lifter operating train from the cam 222a bear a different angular relation to one another from the corresponding arms on the shaft 220, but the principle of operation is the same. The cam 222a is fast upon the cam shaft 18.

The driver 23, as is usual in machines for applying fasteners of the kind here involved, includes a pair of retreating spring projected pins 269, Figure 5, at its lower end for entering the perforations in the lowermost fastener contained in the movable chute section 22. When these pins have descended far enough to bear, through the envelope, against the upper face of the anvil 23 they are arrested while the driver, itself, continues to descend. The pins are effective to withdraw the innermost fastener from the end of the chute section as the lower end of the chute section is moved, rightwardly in Figure 3, out of alignment with the driver.

The driver 23 is mounted for vertical reciprocation in a U-shaped bracket 270. A pin 271, Figures 5 and 6, which transfixes the driver is received in slots 272 formed in one end of a forked lever 273. The lever 273 is fulcrumed upon a shaft 274 and has its end remote from the driver pivotally connected to a link 275. The link 275 is pivotally connected at the lower end thereof to an angle lever 276. The lever 276 is fulcrumed upon a shaft 277, and carries a follower 278 which runs in the track of a track cam 279. The cam 279 is fast upon the cam shaft 18. The track cam 279 is so constructed and arranged that it causes the driver to be operated in properly timed relation to the other operating parts.

The arm 24 for oscillating the movable chute section 22 is pivotally connected to a link 280, and the link 280 is, in turn, connected at its lower end to a lever 281. The lever 281 is pivotally mounted upon the shaft 277, and carries a cam follower 282 which is operated by a cam 283 fast on the cam shaft 18. The cam 283 is constructed and arranged to cause the chute section 22 to be oscillated in properly timed relation to the other operating parts of the machine.

The roller 30 is carried by an arm 284 fast on a shaft 285 which is supported in a bracket 285x. An arm 286 also fast on the shaft 285 is pivotally connected to a link 287. The link 287 is, in turn, pivotally connected at its lower end to a lever 288 which is journaled upon the shaft 277. The lever 288 carries a cam follower 289 which cooperates with a cam 290 fast upon the cam shaft 18. The cam 290 is constructed and arranged to cause the roller 30 to be actuated in properly timed relation to the other operating parts. The roller 30 is lifted against the action of a spring 288x, Figure 3, as the stop 17 becomes effective, and is lowered against the envelope as the stop 17 is retracted.

The stop 17 is similar in function to the stop 4 which has already been described. The operating means for the stop 17 is somewhat different, however, and will, therefore, be described briefly. The stop 17 includes a stem 291 which passes through one end of a supporting bar 292. A winged nut 293 threaded through the end of the bar 292 cooperates with the stem 291 to fix the stop 17 in various adjusted relations to the bar 292. The bar 292 is carried on a horizontal portion 294x of a vertical slide 294. A yoke lever 295 embraces the opposite ends of a pin 296 which transfixes the slide 294. The lever 295 is fulcrumed at 297, and carries at its end remote from the slide 294 a cam follower 298. The follower 298 cooperates with a cam 299 fast on the shaft 18 to actuate the stop 17 at the times and in the manner heretofore pointed out.

Guide bars 106a and 107a similar to the guide bars 106 and 107 are provided at the fastener applying station. These bars are in all respects duplicates of the bars 106 and 107 and are supported in the same way. No detailed description of these parts will be given, therefore, but corresponding reference numerals have been applied to corresponding parts with the subscript $a$ added in each instance. Similar guide bars, not shown, may be supported, between the guide bars 106 and 106a, on the horizontal bars 112b, Figure 1.

When the fastener has been applied and the driver has started its retractive movement, the stop 17 is retracted and the roller 30 is simultaneously brought into action. The envelope is accordingly advanced immediately by the traveling belts 43 and 44. The final rollers 105 cooperate with the belts 43 and 44 to discharge the finished envelope from the machine and to deposit it at 300 on any suitable means such as a shelf 301 at the delivery end of the machine. The finished envelopes may be removed from the shelf from time to time as found convenient.

In the detailed description of the illustrated machine, the parts have been described as they would be used for making patch reinforced, clasp fastener envelopes.

It is apparent, however, that the machine may be very readily converted for the making of clasp fastener envelopes without making reinforced patches, by the simple expedient of disabling the cam shaft 6 and retiming the shaft 62 relative to the shaft 18. These readjustments cut out of operation all of the mechanisms which are adapted to act on the envelope at the patch applying station and change the timing of all of the separator parts as a single unit in relation to the timing of all of the parts which are adapted to act upon the envelope at the fastener applying station.

When it is desired to switch back to the mode of operation which involves the application of patches as well as the application of fasteners, it is only necessary to turn the knob 58 until the pin 59 comes into register with the bore 60, whereupon the plunger tip 56 is urged toward the sprocket 48. As soon as the opening 57 in the sprocket 48 comes into register with the plunger tip 56, the plunger tip snaps into the opening 57, so that the patch applying mechanism is rendered operative, its previous timing relative to the fastener applying mechanism being automatically restored. The shaft 62 then requires readjustment to restore it to its original timing with respect to the shafts 6 and 18.

I have described what I believe to be the best embodiments of my invention. I do not wish, however, to be confined to the embodiments shown, but what I desire to cover by Letters Patent is set forth in the appended claims.

I claim:

1. A machine for making patch reinforced, clasp fastener envelopes including, in combination, means for applying a reinforcing patch to the inner face of the back of an envelope at a first station, means for applying a clasp fastener to the back of the envelope at a second station, including the clinching of the fastener to the reinforcing patch, and means for mechanically advancing the envelope to the first station for the patch applying operation and then to the second station for the fastener applying operation.

2. A machine for making patch reinforced, clasp fastener envelopes including, in combination, means for advancing envelopes step by step past successive operating stations, means at the first station for applying a patch to the inner face of the back of the envelope while an envelope is at that station, and means at a subsequent station for delivering a fastener and clinching it to the back of the envelope and to the patch while the patch reinforced envelope is at the latter station., 3. A machine for making patch reinforced, clasp fastener envelopes including, in combination, means for supporting a stack of envelopes, means for separating the envelopes from the stack one by one in definitely timed relation, means for advancing the separated envelopes along a definite path, patch applying mechanism disposed along said path for first delivering and affixing a reinforcing patch to the inner face of the back of an envelope, and fastener applying mechanism disposed along said path for thereafter delivering a clasp fastener and clinching it to the back of the envelope and to said patch, all in definitely timed relation to the advance of the envelope.

4. A machine for making clasp fastener envelopes comprising, in combination, means for advancing envelopes along a definite path, means for delivering envelopes in definitely timed relation to said advancing means, a first envelope arresting means for stopping an envelope at a first station for the application of a patch thereto, means at the first station for preparing and delivering a patch and affixing it to the inner face of the back of the envelope, a common operating and timing member for said first arresting means and for said patch preparing, delivering and affixing means, a second envelope arresting means at a second station, mechanism at said second station for delivering a clasp fastener to the envelope and for clinching the fastener to the back of the envelope and to the reinforcing patch, a common driving means for the mechanism at the second station and for the common driving and timing member at the first station, and means for instantaneously connecting and disconnecting the common driving and timing member at the first station and said common driving means.

5. A machine for making clasp fastener envelopes comprising, in combination, means for advancing envelopes along a definite path, means for delivering envelopes in definitely timed relation to said advancing means, a first envelope arresting means for stopping an envelope at a first station for the application of a patch thereto, means at the first station for preparing and delivering a patch and affixing it to the inner face of the back of the envelope, a common operating and timing member for said first arresting means and for said patch preparing, delivering and affixing means, a second envelope arresting means at a second station, mechanism at said second station for delivering a clasp fastener to the envelope and for clinching the fastener to the back of the envelope and to the reinforcing patch, a common driving means for the mechanism at the second station and for the common driving and timing member at the first station, and means for instantaneously connecting and disconnecting the common driving and timing member at the first station and said common driving means, comprising coaxial, rotary, driving and driven members, and means capable of effecting a driving connection between them in one angular relation, but incapable of effecting a driving connection in any other angular relation, whereby the timing of said members relative to one another is mechanically predetermined and assured.

6. A machine for making clasp fastener envelopes comprising, in combination, means for advancing envelopes along a definite path, means for delivering envelopes in definitely timed relation to said advancing means, a first envelope arresting means for stopping an envelope at a first station for the application of a patch thereto, means at the first station for preparing and delivering a patch and affixing it to the inner face of the back of the envelope, a common operating and timing member for said first arresting means and for said patch preparing, delivering and affixing means, a second envelope arresting means at a second station, mechanism at said second station for delivering a clasp fastener to the envelope and for clinching the fastener to the back of the envelope and to the reinforcing patch, and means for instantaneously rendering the first arresting means and the mechanism operating at the first station idle and ineffective.

7. A machine for making clasp fastener envelopes comprising, in combination, means for advancing envelopes along a definite path, means for delivering envelopes in definitely timed relation to said advancing means, a first envelope arresting means for stopping an envelope at a first station for the application of a patch thereto, means at the first station for preparing and delivering a patch and affixing it to the inner face of the back of the envelope, a common operating and timing member for said first arresting means and for said patch preparing, delivering and affixing means, a second envelope arresting means at a second station, mechanism at said second station for delivering a clasp fastener to the envelope and for clinching the fastener to the back of the envelope and to the reinforcing patch, and means for instantaneously rendering the first arresting means and the mechanism operating at the first station idle and ineffective, and means for retiming the envelope delivering means relative to the mechanism at the second station when the arresting means at the first station is rendered idle and ineffective.

8. A machine for applying patches to the inner faces of the backs of envelopes comprising, in combination, means for supporting an envelope in position to receive a patch, a patch-carrying anvil, means for reciprocating the anvil between a patch-receiving position outside the envelope and a position in which the patch is properly located for application to the envelope, said anvil having a patch seat in its end, and rigid, integral guard flanges at opposite sides of said seat for preventing engagement of the patch with the back of the envelope as the patch is carried into the envelope, and presser mechanism comprising a presser head operable between the flanges with clearance at either side to press the back of the envelope against the patch on the patch seat.

9. A machine for applying patches to the inner faces of the backs of envelopes comprising, in combination, means for supporting an envelope in position to receive a patch, a patch-carrying anvil, means for reciprocating the anvil between a patch-receiving position outside the envelope and a position in which the patch is properly located for application to the envelope, said anvil having a patch seat in its end, and including a suction passage and a suction port in the patch seat communicating with said passage for holding the patch to the anvil as the patch is carried into the envelope, means for depositing a patch on the patch seat in patch receiving position, and means for pressing the back of the envelope against the patch on the patch seat in the position of patch application.

10. A machine for applying patches to the inner faces of the backs of envelopes comprising, in combination, means for supporting an envelope in position to receive a patch, a patch-carrying anvil, means for reciprocating the anvil between a patch-receiving position outside the envelope and a position in which the patch is properly located for application to the envelope, said anvil having a patch seat in its end, and including a suction passage and a suction port in the patch seat communicating with said passage for holding the patch to the anvil as the patch is carried into the envelope and rigid, integral guard flanges at opposite sides of the patch seat for preventing engagement of the patch with the back of the envelope as the patch is carried into the envelope, means for depositing a patch on the patch seat in patch receiving position, and means operating in the space between the flanges for pressing the back of the envelope against the patch on the patch seat in the position of patch application.

11. A machine for applying patches to the inner faces of the backs of envelopes comprising, in combination, means for supporting an envelope in position to receive a patch, a patch-carrying anvil, means for reciprocating the anvil between a patch-receiving position outside the envelope and a position in which the patch is properly located for application to the envelope, said anvil having a patch seat in its end, and including a suction passage and a suction port in the patch seat communicating with said passage for holding the patch to the anvil as the patch is carried into the envelope, means for depositing a patch on the patch seat in patch receiving position, means for pressing the back of the envelope against the patch on the anvil in the position of patch application, and means for cutting off suction from the suction port in the patch seat of the anvil after the back of the envelope has been pressed against the patch and before the anvil leaves the patch-applying position.

12. A machine for applying patches to the inner faces of the backs of envelopes comprising, in combination, means for supporting an envelope in position to receive a patch, a patch-carrying anvil, means for reciprocating the anvil between a patch-receiving position outside the envelope and a position in which the patch is properly located for application to the envelope, said anvil having a patch seat in its end, said anvil including a suction passage and a suction port in the patch seat communicating with said passage for holding the patch to the anvil as the patch is carried into the envelope, means for depositing a patch on the patch seat in patch receiving position, means for pressing the back of the envelope against the patch on the anvil in the position of patch application, means for feeding the envelope away from its patch-applying position after the patch and the envelope back have been pressed together, and means for cutting off suction from the suction port in the patch seat of the anvil after the patch and the envelope back have been pressed together, but before the anvil leaves the patch applying position and before such feeding of the envelope is begun.

13. A machine for applying patches to the inner faces of envelopes comprising, in combination, means for supporting an envelope in patch-applying position, a reciprocating anvil for carrying a patch from a patch-receiving position into the envelope, said anvil including suction means for holding the patch against disarrangement as it is carried into the envelope, means for delivering a patch onto the anvil in the patch receiving position thereof, and means for pressing the back of the envelope against the patch on the anvil when the patch has been carried into the envelope.

14. A machine for applying patches to the inner faces of envelopes comprising, in combination, means for supporting an envelope in patch-applying position, an anvil for carrying a patch from a patch-receiving position into the envelope, means for feeding patch tape over the anvil in the patch-receiving position thereof, means for pressing the end of the tape against the anvil, said anvil including suction means for holding the end of the tape to itself, and means for severing the end of the patch tape while it is held to the anvil by the suction means.

15. A machine for applying patches to the inner faces of envelopes comprising, in combination, means for supporting an envelope in patch-applying position, an anvil for carrying a patch from a patch-receiving position into the envelope, means for feeding the end of the patch web over the anvil in the receiving position thereof and for severing such end portion to form a patch, said anvil including suction means for holding the patch against disarrangement on the anvil, and means for pressing the end of the patch tape against the anvil before it is severed and for holding the severed patch against the anvil until after the suction means has taken control of the severed patch.

16. A machine for applying patches to the inner faces of envelopes comprising, in combination, means for supporting an envelope in patch-applying position, an anvil for carrying a patch from a patch-receiving position into the envelope, means for feeding patch tape over the anvil in the patch-receiving position thereof, a cutter for severing a patch length from the end portion of the tape which is situated over the anvil, a cutter carrier, means supporting the cutter carrier for oscillation about a fixed axis, means for oscillating the cutter carrier, a curved needle mounted coaxially with the cutter carrier and having the point thereof disposed in advance of the cutting edge of the cutter to engage the tape and press it against the anvil before the patch is severed, said cutter carrier including a needle supporting portion, and spring means mounted on the cutter carrier and normally pressing the needle against said supporting portion of the carrier, said spring means being yieldable to permit further advance of the cutter carrier relative to the needle after the needle has been arrested by the anvil.

17. A machine for applying patches to the inner faces of envelopes comprising, in combination, means for supporting an envelope in patch-applying position, an anvil for carrying a patch from a patch-receiving position into the envelope, means for feeding patch tape over the anvil in the patch-receiving position thereof, a cutter for severing a patch length from the end portion of the tape which is situated over the anvil, a cutter carrier, means supporting the cutter carrier for oscillation about a fixed axis, means for oscillating the cutter carrier, a tape depressing member mounted coaxially with the cutter carrier and having the tape engaging portion thereof disposed in advance of the cutting edge of the cutter to engage the tape and press it against the anvil before the patch is severed, said cutter carrier including a supporting portion on which the tape depressing member normally bears, and spring means mounted on the cutter carrier and normally pressing the tape depressing member against said supporting portion of the carrier, said spring means being yieldable to permit further advance of the cutter carrier relative to the tape depressing member after the tape depressing member has been arrested by the anvil.

18. A machine for applying patches to the inner faces of envelopes comprising, in combination, means for supporting an envelope in patch-applying position, an anvil for carrying a patch from a patch-receiving position into the envelope, a stationary cutting member, a pivotally mounted cooperative cutting member, means for feeding patch tape past the stationary cutting member and over the anvil, means pivotally mounted in coaxial relation to the pivotally mounted cutting member to press the tape against the anvil and hold it in place until after the cutting operation is complete, and means operated by the pivotally mounted cutting member for yieldingly moving the tape pressing means against the tape before the cutting operation and for positively moving the tape pressing means away from the cut patch on the anvil after the cutting operation.

19. In a machine of the class described, in combination, an anvil adapted for insertion into an envelope, means supporting the anvil with capacity for bodily and rocking movements, means for imparting bodily reciprocation to the anvil, means for pressing against the anvil from the outside of the envelope while the anvil is in the envelope, and yielding means for opposing rocking of the anvil to cause the anvil to move in a straight path as it is moved into and out of the envelope.

20. In a machine of the class described, in combination, an anvil adapted for insertion into an envelope, said anvil having a suction passage formed therein and being of rigid construction, means supporting the anvil with capacity for bodily and rocking movements, means for imparting bodily reciprocation to the anvil, means for pressing against the anvil from the outside of the envelope while the anvil is in the envelope, and yielding means for opposing rocking of the anvil to cause the anvil to move in a straight path as it moved into and out of the envelope.

21. In a machine of the class described, in combination, an anvil adapted for insertion into an envelope, means supporting the anvil with capacity for bodily and rocking movements, means for imparting bodily reciprocation to the anvil to cause it to enter and leave the envelope, means for applying pressure to the anvil through the back of the envelope, and a yielding guide constraining the anvil to move in a straight path as it enters and leaves the envelope but permitting the anvil to rock in response to the pressure applied through the back of the envelope.

22. In a machine of the class described, in combination, means for supporting an envelope, an anvil adapted for insertion into the envelope, means supporting the anvil with capacity for bodily movement lengthwise of the envelope body and also for movement in a direction transverse to the plane of the envelope body, means for moving the anvil lengthwise of the envelope body to cause it to enter and leave the envelope, means for applying pressure to the anvil through the back of the envelope, and yielding means constraining the anvil to move in a straight path as it enters and leaves the envelope, but permitting transverse movement of the anvil in response to pressure applied through the back of the envelope.

23. In a machine of the class described, in combination, an anvil adapted for insertion into an envelope, a rock shaft to which the anvil is made fast, means for imparting axial reciprocation to the rock shaft to carry the anvil into and out of the envelope, and yielding means opposing rocking of the shaft to constrain the anvil to enter and leave the envelope in a straight path, but permitting the anvil to yield transversely of said path in response to pressure.

ABRAHAM NOVICK.